United States Patent
Yoshida et al.

(10) Patent No.: US 11,476,541 B2
(45) Date of Patent: Oct. 18, 2022

(54) POWER SUPPLY DEVICE, VEHICLE EQUIPPED WITH SAME, POWER STORAGE DEVICE AND SEPARATOR FOR POWER SUPPLY DEVICE

(71) Applicant: SANYO Electric Co., Ltd., Daito (JP)

(72) Inventors: Naotake Yoshida, Hyogo (JP); Takahide Takeda, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 7 days.

(21) Appl. No.: 16/609,003

(22) PCT Filed: Apr. 24, 2018

(86) PCT No.: PCT/JP2018/016511
§ 371 (c)(1),
(2) Date: Oct. 28, 2019

(87) PCT Pub. No.: WO2018/207608
PCT Pub. Date: Nov. 15, 2018

(65) Prior Publication Data
US 2020/0144576 A1    May 7, 2020

(30) Foreign Application Priority Data

May 12, 2017   (JP) .............................. JP2017-095624

(51) Int. Cl.
*H01M 50/44*        (2021.01)
*H01M 10/658*      (2014.01)
(Continued)

(52) U.S. Cl.
CPC ........... *H01M 50/44* (2021.01); *H01M 10/44* (2013.01); *H01M 10/658* (2015.04); *H01M 50/20* (2021.01); *H01M 50/431* (2021.01)

(58) Field of Classification Search
CPC .... H01M 50/44; H01M 10/658; H01M 50/20; H01M 10/44; H01M 50/431
See application file for complete search history.

(56) References Cited

U.S. PATENT DOCUMENTS

| | | |
|---|---|---|
| 7,764,047 B2 | 7/2010 | Jeon et al. |
| 8,481,191 B2 | 7/2013 | Hermann |
| | (Continued) | |

FOREIGN PATENT DOCUMENTS

| | | |
|---|---|---|
| CN | 204088432 U | 1/2015 |
| CN | 104681750 A | 6/2015 |
| | (Continued) | |

OTHER PUBLICATIONS

International Search Report dated Jul. 17, 2018, issued in counterpart Application No. PCT/JP2018/016511, with English Translation. (4 pages).

(Continued)

*Primary Examiner* — Olatunji A Godo
(74) *Attorney, Agent, or Firm* — WHDA, LLP

(57) ABSTRACT

A power supply device includes secondary battery cells disposed adjacent to each other and a separator that is interposed between the secondary battery cells adjacent to each other. The separator is made of a flexible material that has both a heat insulating property and restoring force such that the separator deforms when being pressed by each of the secondary battery cells and recovers an original shape of the separator. This configuration provides an improved heat insulating property between the secondary battery cells and prevents thermal propagation caused by thermal runaway. At the same time, this allows the separator to adapt to deformation of a secondary battery cell that has thermally swelled. In response to contraction of the swelled battery, the separator recovers its original shape to maintain a mechanical pressing force. This allows the power supply device to (Continued)

provide increased mechanical stability and maintain resistance to vibration and impact.

9 Claims, 8 Drawing Sheets

(51) Int. Cl.
*H01M 10/44* (2006.01)
*H01M 50/431* (2021.01)
*H01M 50/20* (2021.01)

(56) References Cited

U.S. PATENT DOCUMENTS

| | | | |
|---|---|---|---|
| 2007/0285051 A1 | 12/2007 | Jeon et al. | |
| 2010/0273044 A1* | 10/2010 | Culver | H01M 50/529 |
| | | | 429/160 |
| 2011/0189525 A1* | 8/2011 | Palanchon | H01M 10/6551 |
| | | | 429/120 |
| 2012/0268072 A1* | 10/2012 | Okuno | H01M 50/431 |
| | | | 320/128 |
| 2014/0193685 A1 | 7/2014 | Lim | |
| 2014/0335398 A1 | 11/2014 | Partin et al. | |
| 2015/0072243 A1* | 3/2015 | Ogg | H01M 50/463 |
| | | | 429/249 |
| 2016/0204390 A1* | 7/2016 | Choi | H01M 10/058 |
| | | | 429/176 |

FOREIGN PATENT DOCUMENTS

| | | |
|---|---|---|
| CN | 105229819 A | 1/2016 |
| CN | 205028986 U | 2/2016 |
| JP | 2006-196230 A | 7/2006 |
| JP | 2010-238554 A | 10/2010 |
| JP | 2011-96465 A | 5/2011 |
| JP | 2013-4294 A | 1/2013 |
| JP | 2014-72063 A | 4/2014 |
| TW | 201304248 A | 1/2013 |
| WO | WO2012/172829 | * 12/2012 |

OTHER PUBLICATIONS

English Translation of Search Report dated Oct. 25, 2021, issued in counterpart CN Application No. 201880031530.9. (3 pages).

English Translation of Search Report dated Apr. 13, 2022, issued in counterpart to CN Application No. 201880031530.9. (3 pages).

* cited by examiner

POWER SUPPLY DEVICE, VEHICLE EQUIPPED WITH SAME, POWER STORAGE DEVICE AND SEPARATOR FOR POWER SUPPLY DEVICE

TECHNICAL FIELD

The present invention relates to a power supply device and to a vehicle and a power storage device that are each equipped with the power supply device, and to a separator for the power supply device.

BACKGROUND ART

A power supply device including a lot of secondary batteries connected in series or parallel is used for driving a vehicle or other purposes. FIG. 8 is an exploded perspective view of an example of such a power supply device. The power supply device shown in this figure includes a stack of many rectangular secondary battery cells 901 with every spacer 902 interposed between the adjacent battery cells, end plates 903 disposed on end faces of the stack, and bind bars 904 to fasten these components together. Spacer 902 is made of a material such as a hard resin.

In recent years, in response to demand for higher output and miniaturization of batteries, efforts have been made to increase secondary battery cell capacity. In the meantime, it has been a key challenge to ensure the safety of battery modules that each include a plurality of secondary battery cells combined together. In particular, a pressing need is to establish a control technology used in testing on thermal propagation (=fire spread), i.e., an event in which the temperature of a secondary battery cell gets high and heat subsequently propagates to another secondary battery cell adjacent to the former battery cell. The testing on thermal propagation is a test conducted to verify whether or not a battery module eventually bursts or catches fire as a result of a thermal runaway event in one of secondary battery cells included in the battery module and subsequent sequential transmission of heat to the surrounding secondary battery cells.

Meanwhile, a technology needs to be developed to deal with swelling of a secondary battery cell. Repeated charging and discharging of a secondary battery cell causes the battery cell to swell. A battery also swells due to degradation. The force is generated against swelling of a battery due to the charging and discharging or the degradation. In particular, there is a tendency of the force to increase as battery capacity increases. To cope with this problem, there is a need for the development of a structural component, as well as the development of a technology for improving module rigidity (a separator used to prevent secondary battery cells from being displaced relative to each other) in response to an increase in module capacity (a rise in a number of series or parallel connections).

There is also demand for downsizing of spacers that are each disposed between secondary battery cells.

CITATION LIST

Patent Literature

PTL 1: US 2014/0193685 A

SUMMARY OF THE INVENTION

The present invention has been made in view of the above background. It is an object of the present invention to provide a power supply device that has a thermal propagation (=fire spread) prevention function to reduce influence given by a secondary battery cell that has been partly heated to a high temperature to another secondary battery cell adjacent to the heated secondary battery cell. It is another object of the present invention to provide a vehicle and a power storage device that are each equipped with the power supply device, and a separator for the power supply device.

A power supply device according to a first aspect of the present invention includes a plurality of secondary battery cells disposed adjacent to each other and a separator interposed between the secondary battery cells adjacent to each other. The separator is made of a flexible material that has both a heat insulating property and restoring force such that the separator deforms when being pressed by each of the secondary battery cells and recovers an original shape of the separator. The configuration described above provides an improved heat insulating property between the secondary battery cells and prevents thermal propagation (=fire spread) caused by thermal runaway. At the same time, this allows the separator to adapt to deformation of a secondary battery cell that has thermally swelled. In response to contraction of the swelled battery, the separator recovers its original shape to maintain a mechanical pressing force. This allows the power supply device to provide increased mechanical stability and maintain resistance to vibration and impact.

In a power supply device according to a second aspect of the present invention, in addition to the configuration described above, the separator has a mesh structure and forms a thermal propagation (=fire spread) prevention layer with a heat insulating property owing to air that exists in a vacant space of the mesh structure.

In a power supply device according to a third aspect of the present invention, in addition to any one of the configurations described above, the separator has a sheet shape, and a thickness of the separator being pressed by each of the secondary battery cells is greater than or equal to 0.50 mm.

In a power supply device according to a fourth aspect of the present invention, in addition to any one of the configurations described above, the separator is made of a heat-resistant fiber that is an inorganic material.

In a power supply device according to a fifth aspect of the present invention, in addition to any one of the configurations described above, the separator is made of a metallic crystal fiber having a surface coated with an electrically insulating material.

A power supply device according to a sixth aspect of the present invention is any one of the power supply devices described above acting as a power supply device for driving a vehicle.

A vehicle according to a seventh aspect of the present invention includes any one of the power supply devices described above, a traction motor that receives electric power from the power supply device, a vehicle body that incorporates the power supply device and the traction motor, and a wheel that is driven by the traction motor to let the vehicle body travel.

A power supply device according to an eighth aspect of the present invention includes any one of the power supply devices described above and a power supply controller to control charging and discharging of the power supply device. The power supply controller enables charging of the secondary battery cells with electric power supplied from an outside and controls the secondary battery cells to charge.

A separator according to a ninth aspect of the present invention is a separator that is configured to be interposed between a plurality of secondary battery cells disposed adjacent to each other. The separator is made of a porous material and forms a thermal propagation (=fire spread) prevention layer owing to air contained inside the porous material. The configuration described above provides an improved heat insulating property between the secondary battery cells and prevents thermal propagation caused by thermal runaway. At the same time, this allows the separator to adapt to deformation of a secondary battery cell that has thermally swelled. In response to contraction of the swelled battery, the separator recovers its original shape to maintain a mechanical pressing force. This allows the power supply device to provide increased mechanical stability and maintain resistance to vibration and impact.

DESCRIPTION OF EMBODIMENTS

Exemplary embodiments of the present invention will be described below with reference to the drawings. However, the exemplary embodiments described below show only an example for embodying the technical idea of the present invention, and the present invention is not limited to the following. Further, in the present description, components shown in the scope of claims are not limited to the components of the exemplary embodiments. In particular, it is not intended to limit the scope of the present invention to the sizes, materials, and shapes of components and relative arrangement between the components, which are described in the exemplary embodiments, unless otherwise specified.

The sizes and the like are mere explanation examples. However, the sizes and the positional relation of the components in each drawing are exaggerated for clearing the explanation in some cases. Furthermore, in the following description, the same names or the same reference marks denote the same components or the same types of components, and detailed description is therefore appropriately omitted. Regarding the elements constituting the present invention, a plurality of elements may be formed of the same component, and one component may serve as the plurality of elements. To the contrary, the function of one component may be shared by the plurality of components.

(First Exemplary Embodiment)

Figure 1:
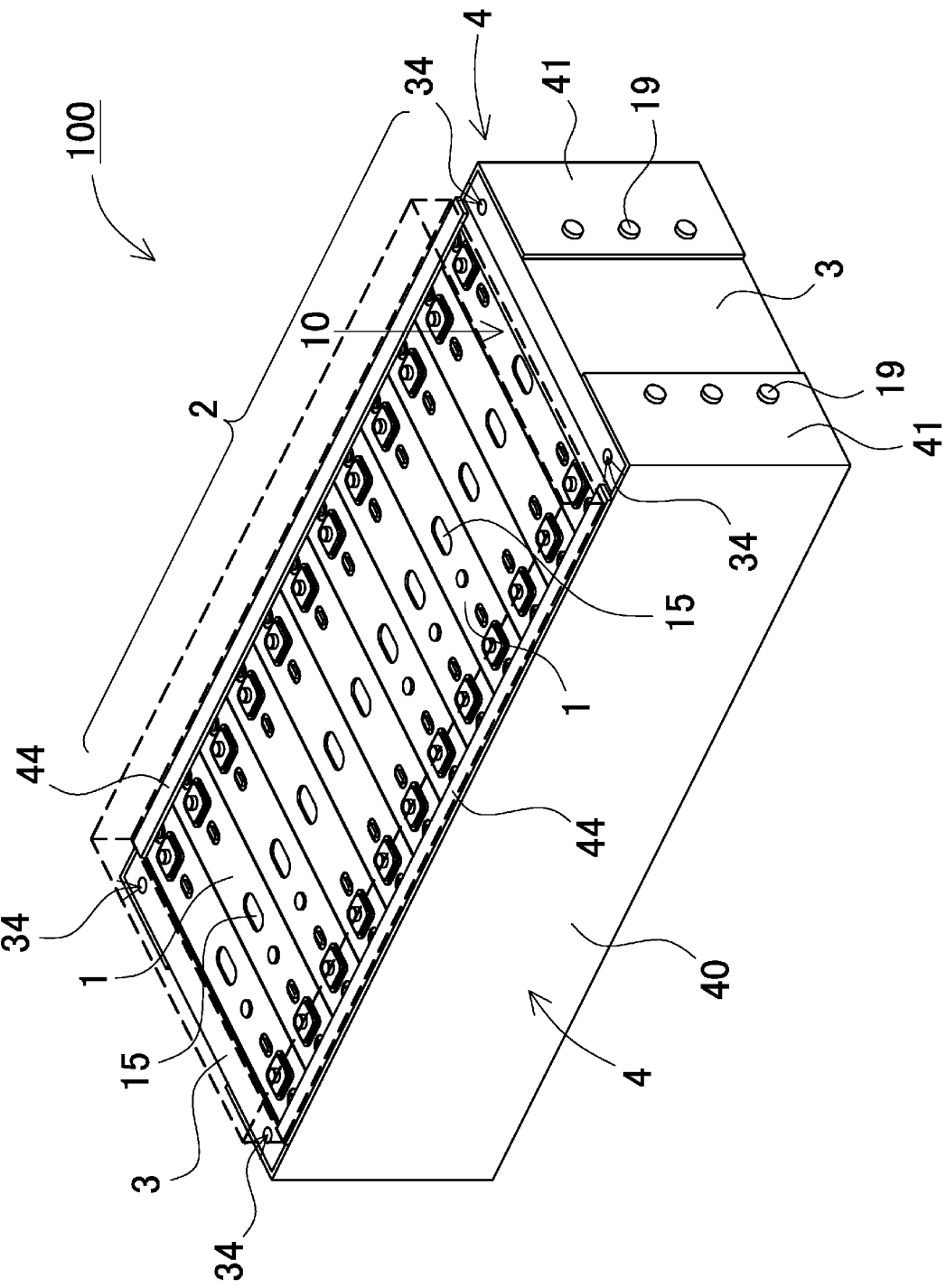
FIG. 1 is a perspective view of an assembled battery according to an exemplary embodiment of the present invention.
Figure 2:
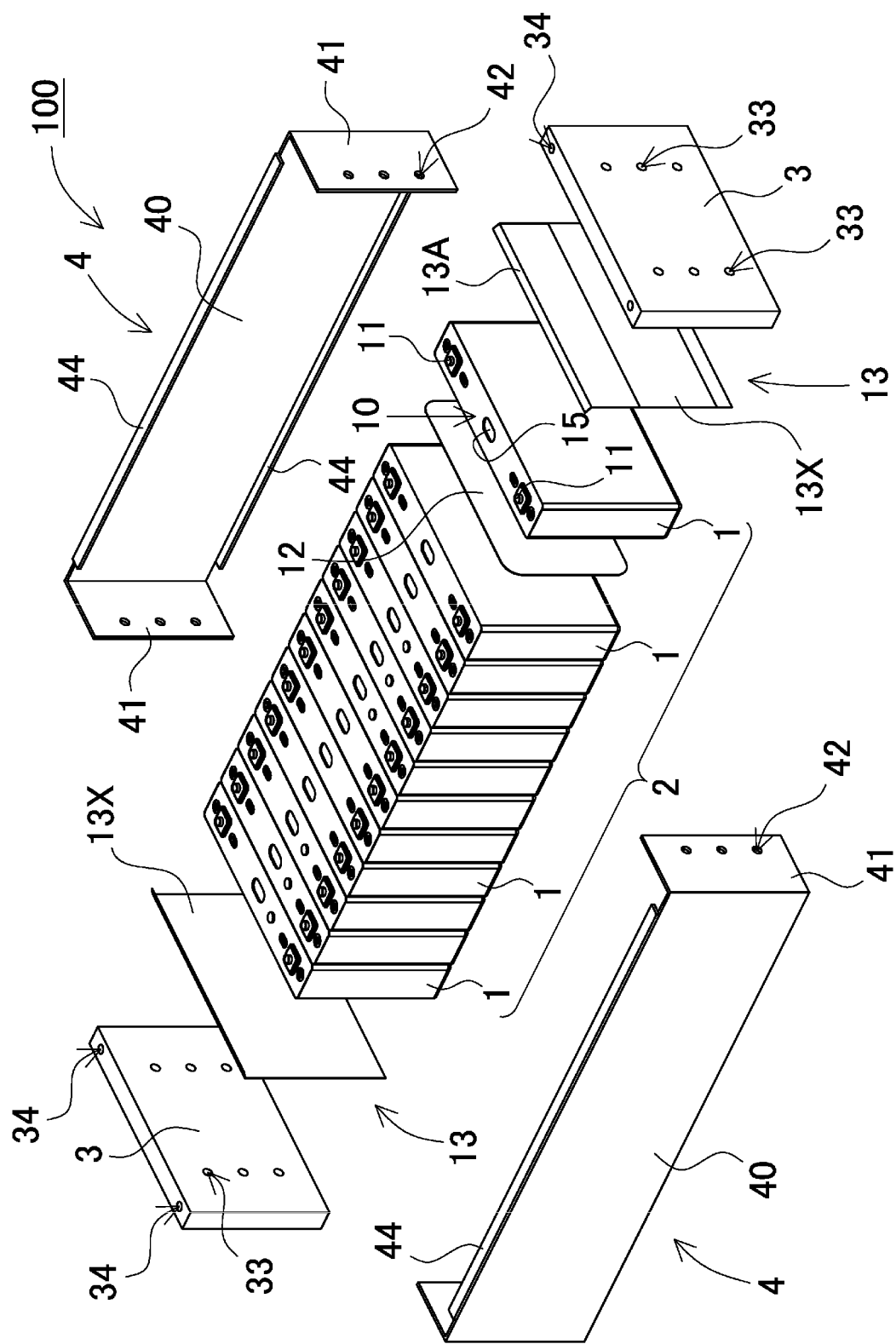
FIG. 2 is an exploded perspective view of the assembled battery shown in FIG. 1.

FIG. 1 and FIG. 2 are a perspective view and an exploded perspective view, respectively, of power supply device 100 according to a first exemplary embodiment of the present invention. Power supply device 100 shown in these figures includes battery stack 2 in which a plurality of secondary battery cells 1 is stacked, a pair of end plates 3 disposed at both ends of battery stack 2, and a pair of fastening members 4 to fasten battery stack 2 with both ends of the fastening members connected to the pair of end plates 3. In power supply device 100, each fastening member 4 includes main body 40 disposed along a side surface of battery stack 2 and fixing portions 41 being bended at both ends of main body 40 and being secured to outer surfaces of end plates 3.

(Secondary Battery Cell 1)

As shown in FIG. 2, secondary battery cell 1 is greater in width than in thickness and in other words, is a prismatic (or rectangular) battery that is narrower in thickness than in width. Secondary battery cells 1 are stacked in a thickness direction to form battery stack 2. Secondary battery cell 1 is a lithium ion secondary battery. However, the secondary battery cell may be a nickel hydride battery, a nickel-cadmium battery, or any other rechargeable secondary battery. Secondary battery cell 1 houses positive and negative electrode plates and an electrolyte in an exterior can of a hermetically sealed structure. The exterior can is a sheet of metal, such as aluminum or an aluminum alloy, that is press molded into a rectangular parallelepiped shape and an opened face of the exterior can is hermetically sealed with a sealing plate. The sealing plate is made of aluminum or an aluminum alloy in the same way as the exterior can and has positive and negative electrode terminals 11 that are fixed to both ends. The sealing plate further includes gas discharge valve 15 disposed between positive and negative electrode terminals 11.

The plurality of secondary battery cells 1 is stacked to constitute battery stack 2 such that a thickness direction of each of secondary battery cells 1 aligns with a stacking direction of the secondary battery cells. In battery stack 2, the plurality of secondary battery cells 1 is stacked such that terminal surfaces 10 each provided with positive and negative electrode terminals 11 are flush with one another.

(Separator 12)

As shown in FIG. 2, battery stack 2 includes separators 12 each put between stacked secondary battery cells 1. In the figure, separator 12 is made of an electrically insulating material and has a thin plate shape or a sheet shape. Separator 12 shown in the figure has a plate shape substantially equal in size to a facing surface of secondary battery cell 1 and is put between stacked secondary battery cells 1 adjacent to each other to electrically insulate adjacent secondary battery cells 1 from each other. Apart from separator 12, a second spacer may be disposed between adjacent secondary battery cells 1. If the battery stack includes a spacer shaped such that a flow path for a cooling gas is formed between secondary battery cell 1 and the spacer, secondary battery cell 1 can be cooled. A surface of secondary battery cell 1 may be coated with an electrically insulating material. A shrink tube made of polyethylene terephthalate (PET) resin, for example, may be thermally welded on a surface of the exterior can, excluding electrode portions, of the secondary battery cell.

(Battery Stack 2)

In battery stack 2, a metallic bus bar (not shown) is connected to positive and negative electrode terminals 11 of adjacent secondary battery cells 1 such that the plurality of secondary battery cells 1 is connected in series, in parallel, or in series and parallel via the bus bars. Battery stack 2 shown in the figure includes 12 secondary battery cells 1 connected in series. However, the present invention does not limit a number and a coupling state of secondary battery cells 1 constituting the battery stack.

(End face spacer 13)

End plates 3 are disposed such that end face spacers 13 are interposed between both end surfaces of battery stack 2 and the respective end plates. As shown in FIG. 2, end face spacers 13 disposed between battery stack 2 and respective end plates 3 electrically insulate end plates 3 from battery stack 2. End face spacer 13 is made of a material similar to the material for separators 12 described above. End face spacer 13 shown in the figure includes plate 13X that has a size so as to completely cover the facing surface of secondary battery cell 1. Plates 13X are stacked between secondary battery cells 1 disposed at both ends of battery stack 2 and end plates 3, respectively.

End face spacer 13 shown in FIG. 2 further includes terminal surface cover 13A joined to an upper edge of plate 13X to cover terminal surface 10 of secondary battery cell 1. In FIG. 2, terminal surface cover 13A included in end face spacer 13 is joined to all of the upper edge of plate 13X and protrudes over secondary battery cell 1. In this way, a structure of each end face spacer 13 in which terminal surface cover 13A is joined to all of the upper edge of plate 13X reliably covers terminal surface 10, a top surface of secondary battery cell 1, and hence provides an improved electrical insulation property while ensuring an electrical insulation distance between each end plate 3 and battery stack 2.

(End Plate 3)

As shown in FIGS. 1 and 2, end plates 3 are disposed at both ends of battery stack 2 and are fastened with each other through fastening members 4 that are disposed along both side faces of battery stack 2. End plates 3 are located at both ends in the stacking direction of secondary battery cells 1 of battery stack 2 and are disposed outside respective end face spacers 13 such that battery stack 2 is put between the end plates at both ends. End plate 3 is made of an aluminum alloy. Examples of the aluminum alloy include Al—Cu—Mg alloys, Al—Cu—Ni—Mg alloys, Al—Cu—Si alloys, Al—Si—Mg alloys, Al—Si—Cu alloys, Al—Si—Cu—Mg alloys, and Al—Si—Cu—Ni—Mg alloys. Aluminum alloy-made end plate 3 is a heat-treatable aluminum alloy. Aluminum alloy-made end plate 3 is, as described later, molded by die casting. Preferably, aluminum alloy-made end plate 3 is, as described later, tempered by heat treatment such as solution treatment, quenching, and age hardening.

Each end plate 3 is a quadrilateral in outer shape and is disposed face-to-face with the end surface of battery stack 2. End plates 3 shown in FIGS. 1 and 2 are substantially equal in outer shape to secondary battery cells 1. In other words, end plate 3 shown in the figure has a width equal to a width of secondary battery cell 1 in a right-left direction and has a height equal to a height of secondary battery cell 1 in an up-down direction. In the description given herein, the up-down direction is an up-down direction in the figure, and the right-left direction is a right-left direction in the figure and a horizontal direction orthogonal to the stacking direction of the battery cells.

End plate 3 shown in FIG. 2 has a plurality of through holes used to fix end plate 3. For instance, end plate 3 has first through hole 33 into which fastener 19 is inserted to secure fixing portion 41 of fastening member 4. End plate 3 shown in the figure has a plurality of first through holes 33 forming openings. End plate 3 in the figure includes the plurality of first through holes 33 formed at intervals in the up-down direction and in both side areas that face fixing portions 41.

End plate 3 in FIG. 2 has a total of six first through holes 33, i.e., three through holes along each side. Fasteners 19 pass through fixing portions 41 disposed on an outer peripheral surface of end plate 3 and are inserted into first through holes 33. Fasteners 19 inserted into first through holes 33 are fixed to first through holes 33 to secure fixing portions 41 at respective fixed places.

End plate 3 further has second through holes 34 apart from first through holes 33. A bolt used to secure the power supply device to a fixed location (e.g., a vehicle for an on-vehicle power supply device) is inserted into the second through hole. Second through holes 34 are located at both ends of a top surface of end plate 3, forming pits.

(Fastener 19)

Fasteners 19 are fixed to first through holes 33 so as to be unremovable. Such fastener 19 may be a screw, a bolt, a rivet, or something similar. The fastener that is a screw or a bolt is screwed into and fixed to first through hole 33 when being inserted into first through hole 33. Thus, an inner surface of first through hole 33, which the fastener that is a screw or a bolt is fixed to, can have a female thread that winds around a male thread of the screw or the bolt. The fastener that is a rivet is inserted into first through hole 33 in end plate 3 with the rivet passing through the fixing portion. At the same time, one end of the rivet is tightened inside first through hole 33 to secure end plate 3 and the fixing portion together. The fastener that is a rivet joins first through hole 33 in end plate 3 and an opening edge of a through hole in the fixing portion with a tightened part formed inside each through hole 33 in end plate 3 to secure the fixing portion to end plate 3. A structure of first through hole 33 into which the rivet is inserted may have an inner shape such that a small opening area at the outer surface of the end plate does not allow a head of the rivet to pass through and such that a large opening area at a surface of the end plate being opposite the outer surface and facing the battery stack allows the tightened part formed as a deformed part of the rivet to be disposed inside the first through hole.

(Fastening Member 4)

As shown in FIGS. 1 and 2, extending along the stacking direction of battery stack 2, fastening members 4 fasten battery stack 2 via end plates 3 in the stacking direction, with both ends of each fastening member 4 being fixed to end plates 3 disposed at both end surfaces of battery stack 2. Fastening member 4 is a metal sheet having a predetermined width along each side surface of battery stack 2, as well as a predetermined thickness. Fastening members 4 are disposed so as to face both respective side surfaces of battery stack 2. Fastening member 4 may be made of a sheet of iron or other metal and preferably be made of a steel sheet. Metal sheet-made fastening member 4 is bent by press forming or other processing and is formed into a predetermined shape.

Each fastening member 4 includes main body 40 disposed along the side surface of battery stack 2 and fixing portions 41 being bended at both ends of main body 40 and being secured to the outer surfaces of end plates 3. Main body 40 has a rectangular shape with a size so as to cover substantially completely battery stack 2 and end plates 3 disposed at both ends of the battery stack. Main body 40 shown in FIG. 1 covers substantially completely the side surface of battery stack 2 without any gap. However, main body 40 may have one or more openings to expose a part of the side surface of the battery stack.

Both ends of fastening member 4 are bent along the outer surfaces of end plates 3 to secure the both ends that constitute fixing portions 41 to the pair of end plates 3. Fixing portions 41 shown in the figure are substantially equal in height in the up-down direction to main bodies 40 and end plates 3 and cover both right and left sides of end plates 3. Fastening members 4 are fixed to end plates 3 with fasteners 19 that are inserted into through holes 42 formed in ends of fixing portions 41. Fastening member 4 shown in the figure further includes bending portions 44 disposed along an upper edge of an intermediate part of main body 40 except both ends to hold a top surface and a bottom surface of battery stack 2. Bending portions 44 hold top and bottom surfaces of each secondary battery cell 1 that constitutes battery stack 2 to prevent terminal surfaces 10 of secondary battery cells 1 from slipping out of place in the up-down direction.

Although no illustration is given in the figure, each fastening member 4 may be provided with an electrically insulating sheet that is disposed on an inner surface of main body 40 and bending portions 44 to electrically insulate secondary battery cells 1 of battery stack 2 from fastening member 4. Although no illustration is given in the figure, fastening members 4 may be each provided with a cushioning material that is disposed on an inner surface of both ends of main body 40 to protect both side surfaces of end plates 3 from vibration or other impacts.

(Details of separator 12)

Figure 3:
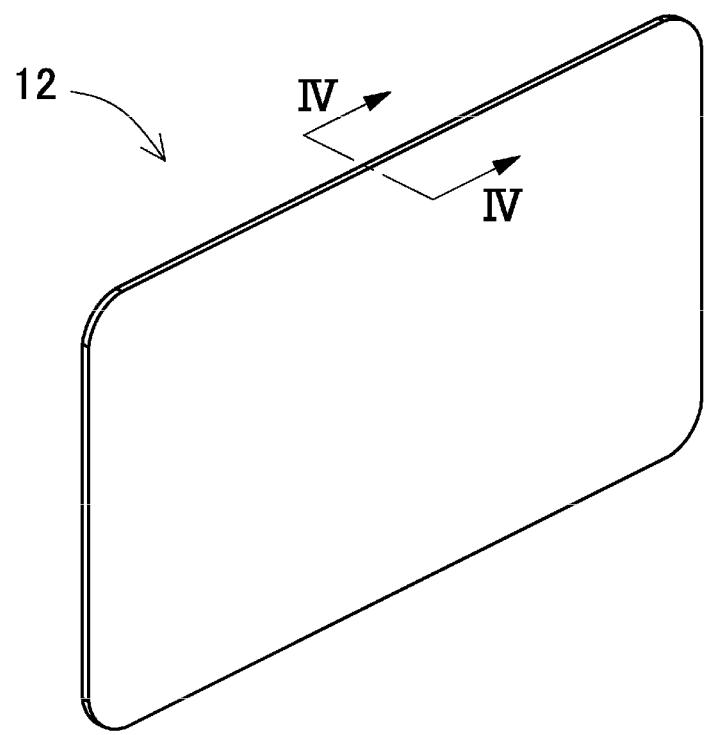
FIG. 3 is a perspective view of a separator.

A perspective view of separator 12 is shown in FIG. 3. Separator 12 is made of a material having an improved heat insulating property. Preferably, the material for separator 12 is a material having an electrically insulating property. Preferably, the material for separator 12 is a material that also has flexibility. In other words, if separator 12 is pressed by a swelled secondary battery cell, separator 12 made of a flexible material deforms to accommodate force for deformation. At the same time, separator 12 has restoring force to recover its original shape in response to a reduction in stress. This configuration allows the separator to tolerate a deformation due to swelling of the secondary battery cell and maintain fastening force for the battery stack. Normal charging or discharging as well as an abnormality in battery condition cause a secondary battery cell to swell or contract. The separator having the configuration described above is able to adapt to an amount of deformation of a swelled secondary battery cell and thereby lessen stress. However, if a gap is created in response to contraction of a swelled battery, fastening force of fastening members 4 used to fasten battery stack 2 relatively weakens, resulting in looseness owing to a shake or vibration and causing fastening members 4 or other parts to be worn or broken. Hence, this separator recovers its original thickness to reduce looseness and displays stable retention. Meanwhile, if a deformation of a swelled battery cell is too much, the separator gets thinner, resulting in a decrease in heat insulating performance. In this exemplary embodiment, the separator is designed such that a thickness of the separator being pressed by the secondary battery cell is greater than or equal to 0.50 mm and is preferably greater than or equal to 0.65 mm. This enables the separator to maintain heat insulating performance even during swelling of the secondary battery cell. Preferably, Young's modulus for the separator is between $10^8$ N/m$^2$ and $10^9$ N/m$^2$.

Figure 4A:
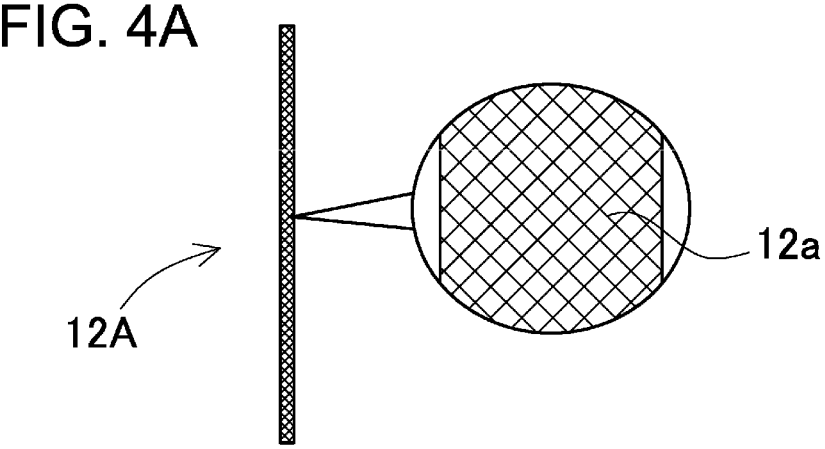
FIG. 4A is a cross-sectional view of a separator according to a first exemplary embodiment taken from line IV-IV of FIG. 3, with an enlarged cross-sectional view of a main part.

To achieve such an electrically insulating property, a heat insulating property, and flexibility, the separator, for example, has a mesh structure with a fiber woven in. FIG. 4A is a cross-sectional view of separator 12A according to the first exemplary embodiment taken from line IV-IV of FIG. 3, and the separator, for example, includes mesh layer 12a. Since separator 12A is made of such a mesh material, mesh layer 12a has a vacant space. Thus, if external force is applied to the separator, the space narrows and a size of the separator changes. When the vacant space in mesh layer 12a is narrowed in response to deformation, an elastic property of the fiber contributes to properties of the separator. Consequently, if a proportion of the vacant space in mesh layer 12a and Young's modulus for the fiber are set to proper values, the separator can be designed such that the thickness of the separator being pressed by the secondary battery cell is greater than or equal to 0.50 mm and is preferably greater than or equal to 0.65 mm. Preferably, the fiber included in the separator has a low thermal conductive property. In other words, separator 12A with an improved heat insulating property is able to function as a thermal propagation (=fire spread) prevention layer. If a secondary battery cell located at one of opposing surfaces of separator 12A reaches a high temperature due to thermal runaway or other failure, the thermal propagation prevention layer prevents transmission of heat to a secondary battery cell located at the other opposing surface. The separator, which includes mesh layer 12a, provides increased flexibility, deforms by compression, and shows resilience. The material having these properties may be a nonmetallic inorganic material such as a resin-made fiber with high heat resistance (e.g., a flame-resistant vinylon fiber, a polyetherimide fiber, and an aramid fiber). Alternatively, the separator may be made of a thread of metal or wire in the form of mesh having a surface coated with an electrically insulating material.

Figure 4B:
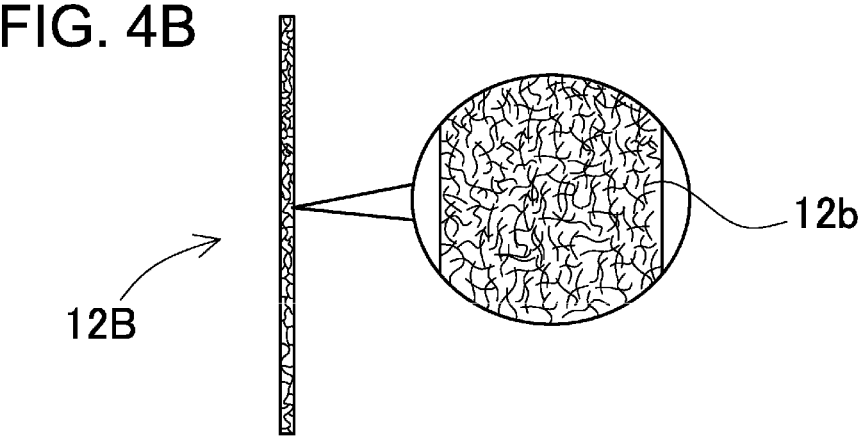
FIG. 4B is a cross-sectional view of a separator according to a second exemplary embodiment taken from line IV-IV of FIG. 3, with an enlarged cross-sectional view of a main part.
Figure 4C:
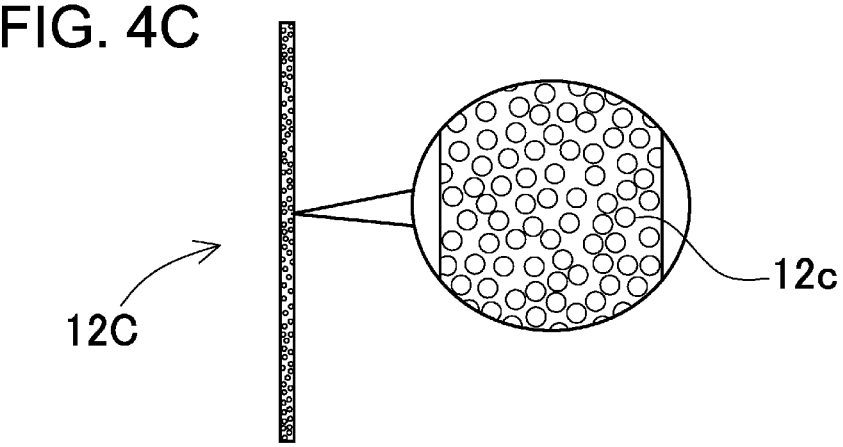

Apart from the mesh vacant space having regularity to some extent, the separator may be made of a fiber having a random vacant space. The separator may be, for example, made of fiber material 12b containing randomly interwoven short fibers. An example of such a separator is shown in FIG. 4B, which illustrates an enlarged cross-sectional view of a main part of separator 12B according to a second exemplary embodiment. Fiber material 12b may be rock wool, glass fiber, a metallic crystal fiber having a surface coated with an electrically insulating material, or a resin-made fiber with high heat resistance (e.g., a flame-resistant vinylon fiber, a polyetherimide fiber, and an aramid fiber). Separator 12B made of such a fibrous material also provides an air layer with high compressibility and high heat resistance.

Preferably, a surface of the separator has an increased friction coefficient to produce a nonskid effect. This enables a battery module to provide increased resistance to vibration and impact. For instance, a nonskid coating is applied to the surface of the separator.

Preferably, a surface area of the separator is smaller than a surface of the secondary battery cell. This contributes to a reduction in force applied to the sealing body of the secondary battery cell in response to expansion of the secondary battery cell and thereby avoids breakage of the exterior can of the secondary battery cell. The separator that has a size smaller than the secondary battery cell makes a heat transmission area smaller, resulting in an improvement in heat insulating property.

In the examples described above, the technique is applied to the secondary battery cell having the rectangular parallelepiped exterior can. Apart from the rectangular parallelepiped battery cell, the technique of the present invention can be applied to batteries of other shapes such as laminate-shaped secondary battery cells and cylindrical secondary battery cells.

The power supply device described above can be used as an on-vehicle power supply. A vehicle incorporating the power supply device may be an electrified vehicle such as a hybrid vehicle or a plug-in hybrid vehicle that is driven by an engine and a motor, or an electric vehicle that is driven only by a motor. The power supply device can be used as a power supply for any of these vehicles. Power supply device 1000 having high capacity and high output to acquire electric power for driving the vehicle will be described below, for example. Power supply device 1000 includes a large number of the above-described power supply devices connected in series or parallel, as well as a necessary controlling circuit.

(Power Supply Device for Hybrid Vehicle)

Figure 5:
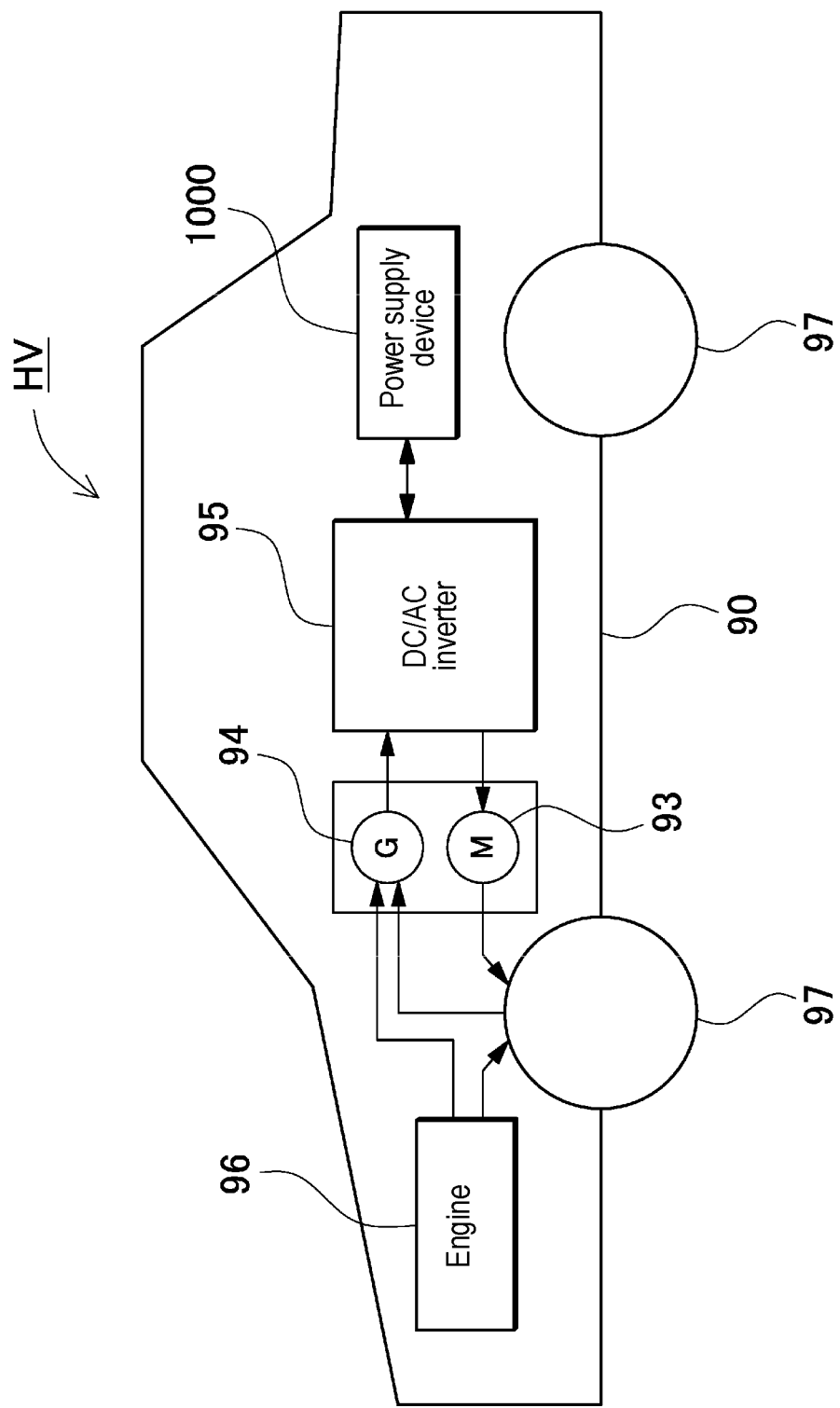
FIG. 5 is a block diagram illustrating an example of a battery device incorporated in a hybrid vehicle that is driven by an engine and a motor.

FIG. 5 illustrates an example of a power supply device incorporated in a hybrid vehicle (HV) that is driven by both an engine and a motor. The HV incorporating the power supply device shown in this figure includes vehicle body 90, engine 96 and traction motor 93 to let vehicle body 90 travel, power supply device 1000 to supply motor 93 with electric power, power generator 94 to charge batteries included in power supply device 1000, and wheels 97 that are driven by motor 93 and engine 96 to let vehicle body 90 travel. Power supply device 1000 is connected to motor 93 and power generator 94 via direct current (DC)/alternating current (AC) inverter 95. The HV travels by both of motor 93 and engine 96 while charging and discharging the batteries of power supply device 1000. Motor 93 is driven when the engine efficiency is low, for example, during acceleration or low-speed travel, and makes the vehicle travel. Motor 93 runs on electric power supplied from power supply device 1000. Power generator 94 is driven by engine 96 or driven through regenerative braking, a mechanism that slows the vehicle, to charge the batteries in power supply device 1000.

(Power Supply Device for Electric Vehicle)

Figure 6:
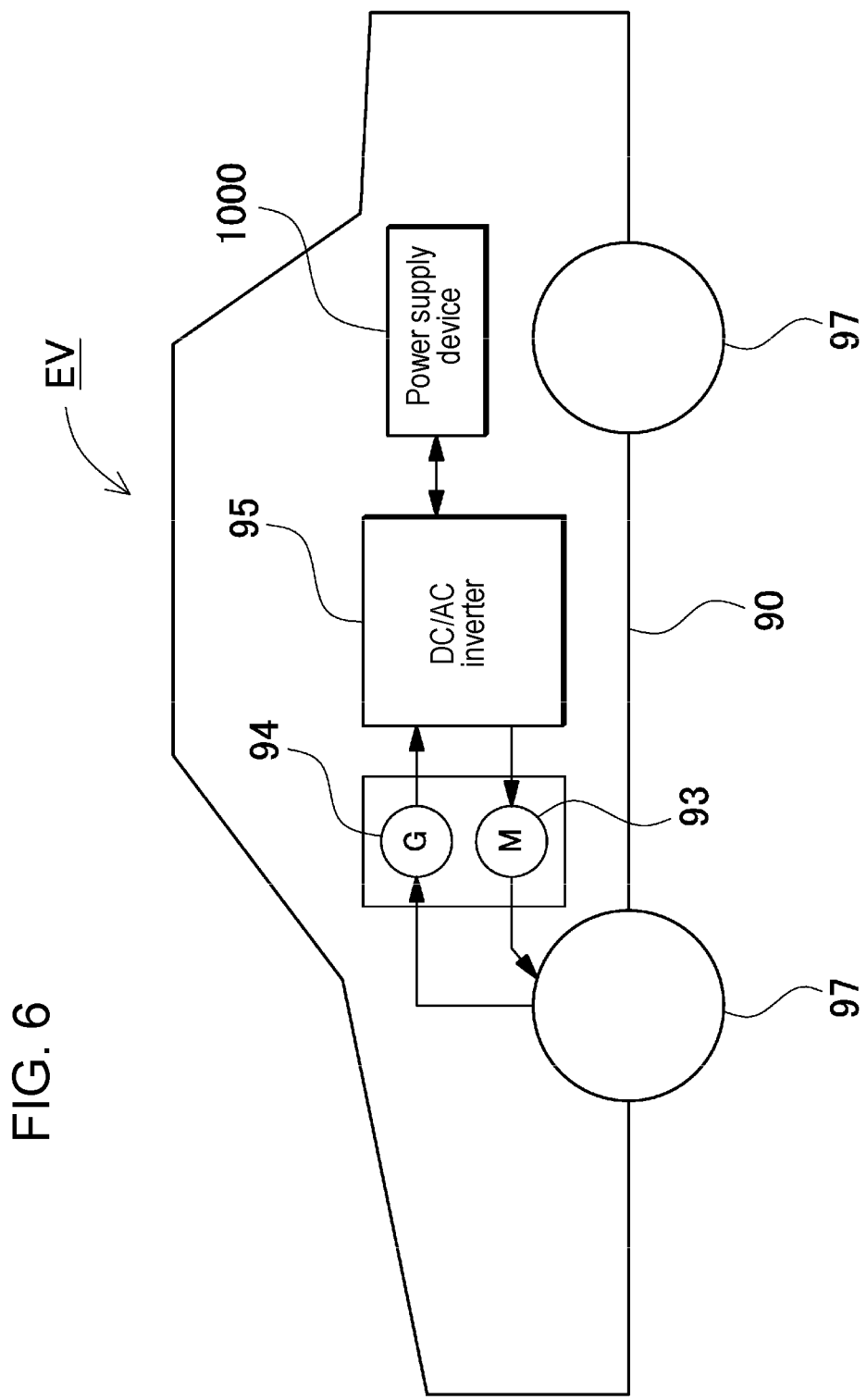
FIG. 6 is a block diagram illustrating an example of a battery device incorporated in an electric vehicle that is driven only by a motor.

FIG. 6 illustrates an example of a power supply device incorporated in an electric vehicle (EV) that is driven only by a motor. The EV incorporating the power supply device shown in this figure includes vehicle body 90, traction motor 93 to let vehicle body 90 travel, power supply device 1000 to supply motor 93 with electric power, power generator 94 to charge batteries included in power supply device 1000, and wheels 97 that are driven by motor 93 to let vehicle body 90 travel. Motor 93 runs on electric power supplied from power supply device 1000. Power generator 94 is driven by energy that is produced from regenerative braking applied to the EV and charges the batteries in power supply device 1000.

(Power Supply Device for Storage of Electricity)

Figure 7:
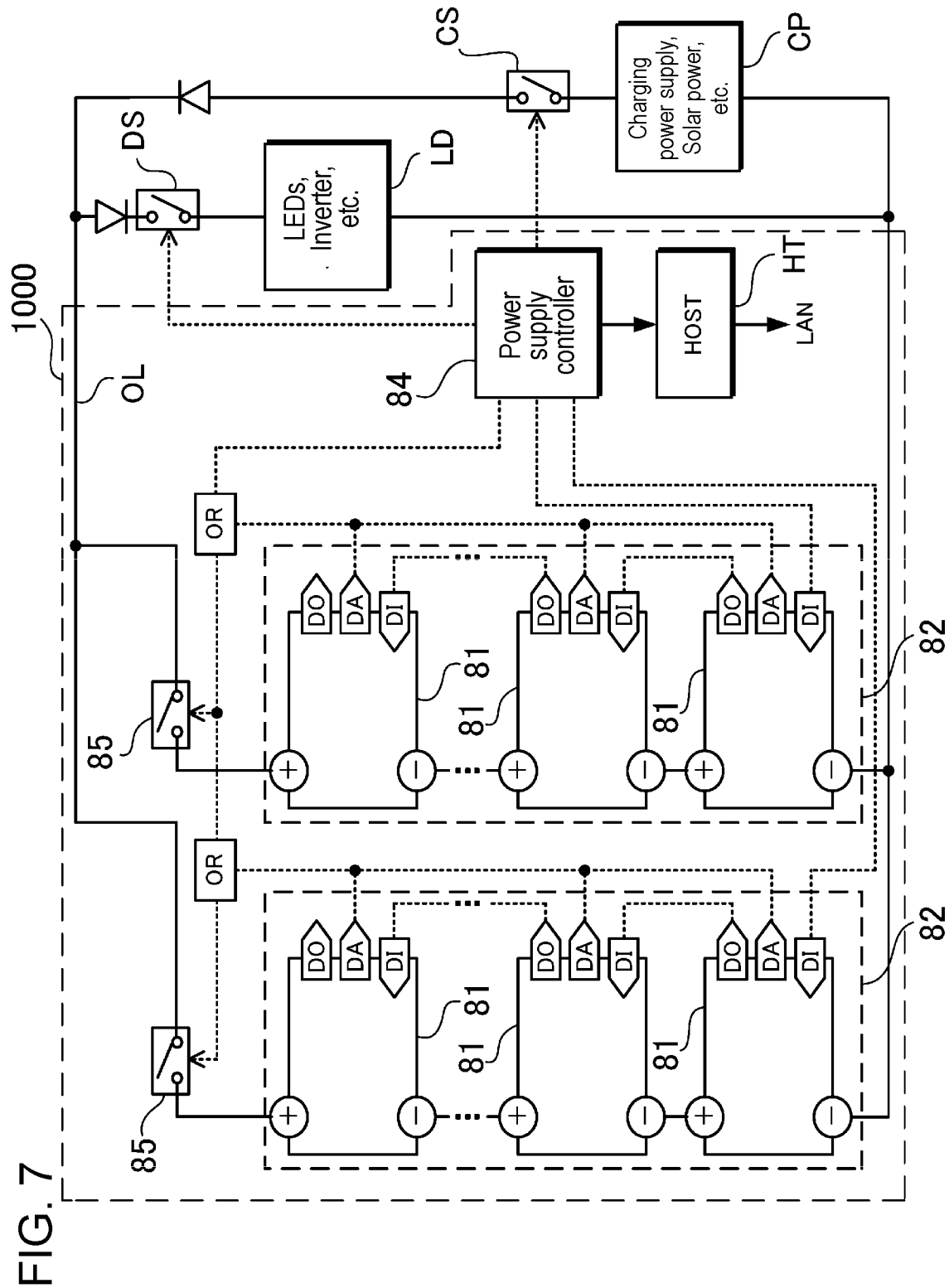
FIG. 7 is a block diagram illustrating an example of a battery device used in a power storage device.
Figure 8:
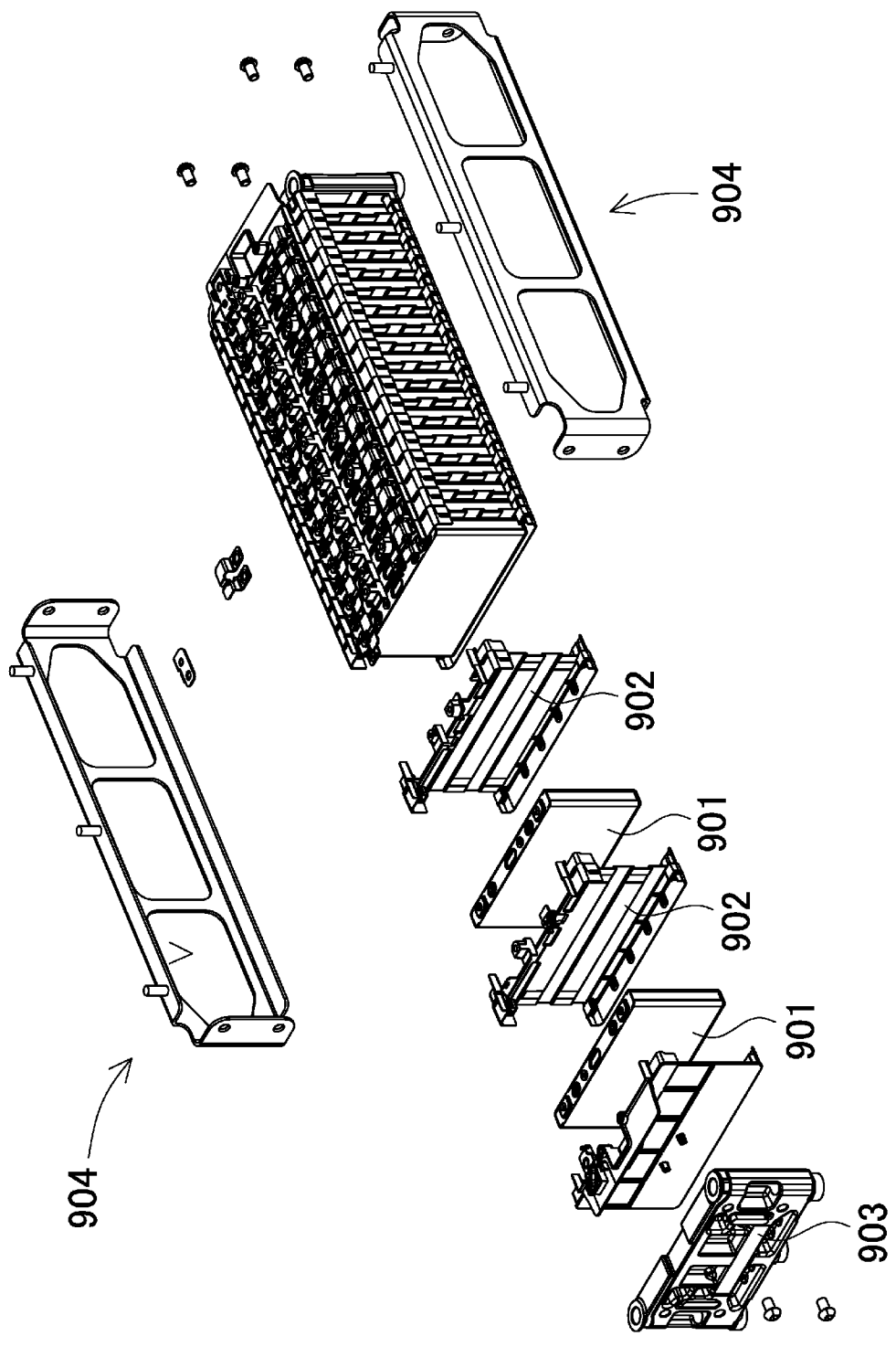
FIG. 8 is an exploded perspective view illustrating a conventional power supply device.

Moreover, the power supply device can be used as a stationary power storage facility, as well as a driving power source for conveyances. Example applications for the power supply device include a power supply system that charges batteries with solar energy, midnight power, or other energy and discharges electricity as necessary to serve as a power supply for household or factory use, a power supply designed to charge batteries with solar energy in the daytime and discharge electricity in the nighttime for street lights, and a backup power supply designed to operate for traffic lights in case of a power failure. FIG. 7 shows such an example application. In power supply device 1000 shown in this figure, battery unit 82 includes a plurality of battery packs 81 connected to form a unit. Each battery pack 81 includes a plurality of secondary battery cells connected in series and/or in parallel. Battery packs 81 are controlled by power supply controller 84. After charge power supply CP charges battery units 82, power supply device 1000 runs load LD. Thus, power supply device 1000 has a charging mode and a discharging mode. Load LD and charge power supply CP are connected to power supply device 1000 via discharge switch DS and charge switch CS, respectively. Power supply controller 84 of power supply device 1000 switches On/Off of discharge switch DS and charge switch CS. In the charging mode, power supply controller 84 turns on charge switch CS, turns off discharge switch DS, and permits charge power supply CP to charge power supply device 1000.

When charging is completed and the battery units are fully charged or when a capacity of the battery units is charged at a predetermined level or higher, power supply controller 84 turns off charge switch CS and turns on discharge switch DS to switch to the discharging mode in response to a request from load LD and permits power supply device 1000 to discharge electricity into load LD. When needed, the power supply controller is allowed to turn on charge switch CS and turn on discharge switch DS to supply electricity to load LD and charge power supply device 1000 simultaneously.

Load LD run by power supply device 1000 is connected to power supply device 1000 via discharge switch DS. When power supply device 1000 is put in the discharging mode, power supply controller 84 turns on discharge switch DS and establishes connection to load LD to run load LD on electricity sent from power supply device 1000. Discharge switch DS may be a switching element such as a field-effect transistor (FET). Power supply controller 84 of power supply device 1000 controls On/Off of discharge switch DS. Power supply controller 84 has a communication interface to communicate with an external device. In FIG. 7, the power supply controller is, for example, connected to host device HT in conformity with a universal asynchronous receiver-transmitter (UART)-based protocol, recommended standard-232C (RS-232C), or another existing communication protocol. A user interface may be provided as needed to allow a user to operate the power supply system.

Each battery pack 81 has a signal terminal and a power source terminal.

The signal terminal includes pack input-output terminal DI, pack abnormal output terminal DA, and pack connection terminal DO. Pack input-output terminal DI is a terminal used to input a signal from or output a signal to another pack battery or power supply controller 84. Pack connection terminal DO is a terminal used to input a signal from or output a signal to another pack battery, i.e., a subsidiary pack. Pack abnormal output terminal DA is a terminal used to output a signal indicating an abnormality in the pack battery to an outside. The power source terminal is a terminal used to connect battery packs 81 in series or parallel. Battery units 82 are connected in parallel to output line OL via respective parallel-connection switches 85.

INDUSTRIAL APPLICABILITY

A power supply device, a vehicle and a power storage device that are each equipped with the power supply device, and a separator for the power supply device, according to the present invention, can find suitable applications including power supply devices for plug-in hybrid vehicles that can switch between the EV drive mode and the HEV drive mode, hybrid electric vehicles, electric vehicles, and the like. The power supply device can be appropriately used for the following applications: a backup power supply device mountable in a rack of a computer sever; a backup power supply device used for wireless base stations of cellular phones; a power source for storage used at home or in a factory; an electric storage device combined with a solar battery, such as a power source for street lights; and a backup power source for traffic lights.

REFERENCE MARKS IN THE DRAWINGS

1: secondary battery cell
2: battery stack
3: end plate
4: fastening member
10: terminal surface
11: electrode terminal
12, 12A, 12B, 12C: separator
12$a$: mesh layer
12$b$: fiber material
12$c$: cavity
13: end face spacer
13X: plate
13A: terminal surface cover
15: gas discharge valve
19: fastener
33: first through hole
34: second through holes
40: main body
41: fixing portion
42: through hole
44: bending portion
81: battery block
82: battery unit
84: power supply controller
85: parallel-connection switch
90: vehicle body
93: motor
94: power generator
95: DC/AC inverter
96: engine
97: wheel
100: power supply device
901: secondary battery cell
902: spacer
903: end plate
904: bind bar
1000: power supply device
HV: hybrid vehicle
EV: electric vehicle
CP: charge power supply
LD: load
DS: discharge switch
CS: charge switch
OL: output line
HT: host device
DI: input-output terminal
DA: abnormal output terminal
DO: connection terminal.

The invention claimed is:
1. A power supply device comprising:
a plurality of secondary battery cells disposed adjacent to each other; and
a separator interposed between the secondary battery cells adjacent to each other, a surface of the separator facing an adjacent one of the secondary battery cells being smaller than a surface of the adjacent one of the secondary battery cells facing the separator,
wherein the separator is made of a flexible fiber material that has both a heat insulating property and restoring force in such a way that the separator deforms when being pressed by each of the secondary battery cells and recovers an original shape of the separator while maintaining a constant area of contact with the adjacent one of the secondary battery cells in response to a reduction in stress,
wherein the surface of the separator facing the adjacent one of the secondary battery cells is formed of an electrically insulating material, and
wherein the separator is configured to electrically insulate the secondary battery cells from each other.

2. The power supply device according to claim 1, wherein the separator has a mesh structure and forms a thermal propagation prevention layer with a heat insulating property owing to air that exists in a vacant space of the mesh structure.

3. The power supply device according to claim 1, wherein the separator has a sheet shape, and
a thickness of the separator being pressed by each of the secondary battery cells is greater than or equal to 0.50 mm.

4. The power supply device according to claim 1, wherein the separator is made of a heat-resistant fiber that is an inorganic material.

5. The power supply device according to claim 1, wherein the separator is made of a metallic crystal fiber having a surface coated with the electrically insulating material.

6. The power supply device according to claim 1, acting as a power supply device for driving a vehicle.

7. A vehicle equipped with the power supply device according to claim 1, the vehicle comprising:
the power supply device;
a traction motor that receives electric power from the power supply device;
a vehicle body that incorporates the power supply device and the traction motor; and
a wheel that is driven by the traction motor to let the vehicle body travel.

8. A power storage device equipped with the power supply device according to claim 1,
the power storage device comprising a power supply controller to control charging and discharging of the power supply device,
wherein the power supply controller enables charging of the secondary battery cells with electric power supplied from an outside and controls the secondary battery cells to charge.

9. The power supply device according to claim 3, wherein a Young's modulus for the separator is between $10^8$ N/m$^2$ and $10^9$ N/m$^2$.

* * * * *